United States Patent
Su et al.

(10) Patent No.: US 9,860,754 B2
(45) Date of Patent: Jan. 2, 2018

(54) COEXISTENCE OPERATION METHOD AND RELATED WIRELESS SYSTEM

(71) Applicant: Ralink Technology Corp., Hsinchu County (TW)

(72) Inventors: I-Feng Su, Hsinchu (TW); Yu-Ju Lee, Miaoli County (TW)

(73) Assignee: MEDIATEK INC., Hsin-Chu (TW)

( * ) Notice: Subject to any disclaimer, the term of this patent is extended or adjusted under 35 U.S.C. 154(b) by 155 days.

(21) Appl. No.: 14/184,669

(22) Filed: Feb. 19, 2014

(65) Prior Publication Data
US 2015/0237505 A1    Aug. 20, 2015

(51) Int. Cl.
| | |
|---|---|
| *H04W 16/14* | (2009.01) |
| *H04W 72/04* | (2009.01) |
| *H04W 72/12* | (2009.01) |
| *H04W 88/06* | (2009.01) |
| *H04W 52/02* | (2009.01) |
| *H04W 4/00* | (2009.01) |
| *H04B 1/10* | (2006.01) |
| *H04W 88/10* | (2009.01) |
| *H04W 52/24* | (2009.01) |

(52) U.S. Cl.
CPC ......... *H04W 16/14* (2013.01); *H04W 72/044* (2013.01); *H04W 72/0446* (2013.01); *H04W 72/0453* (2013.01); *H04B 1/1027* (2013.01); *H04W 4/008* (2013.01); *H04W 52/0238* (2013.01); *H04W 52/243* (2013.01); *H04W 72/1215* (2013.01); *H04W 88/06* (2013.01); *H04W 88/10* (2013.01); *Y02B 60/50* (2013.01)

(58) Field of Classification Search
CPC ............... H04W 92/18; H04W 76/025; H04W 72/1215; H04W 88/06; H04W 16/14; H04W 84/12; H04W 52/0238; H04W 4/008; H04W 72/0453; H04W 52/243; H04W 72/082; H04W 52/028; H04W 88/10; H04J 11/0023; H04J 3/1694; H04B 1/715; H04B 1/406; H04B 1/1027; H04B 15/02
See application file for complete search history.

(56) References Cited

U.S. PATENT DOCUMENTS

| | | | | |
|---|---|---|---|---|
| 8,442,016 | B1* | 5/2013 | Lee ...................... | H04W 16/14 370/338 |
| 2008/0192806 | A1* | 8/2008 | Wyper et al. ................. | 375/133 |
| 2012/0207032 | A1* | 8/2012 | Chen et al. .................... | 370/252 |
| 2013/0324172 | A1* | 12/2013 | Ahn .................. | H04W 36/0094 455/501 |
| 2014/0221028 | A1* | 8/2014 | Desai ..................... | H04B 15/00 455/501 |

* cited by examiner

*Primary Examiner* — Faruk Hamza
*Assistant Examiner* — Aixa Guadalupe-Cruz
(74) *Attorney, Agent, or Firm* — Winston Hsu

(57) ABSTRACT

The present invention provides a coexistence operation method for a wireless system, wherein the wireless system is capable of establishing a first wireless link and a plurality of second wireless link. The coexistence operation method comprises applying different time slots to the first wireless link and a first link of the second wireless links; and applying a different frequency band to a second link of the second wireless links when is the different time slots are applied to the first wireless link and the first link of the second wireless links.

13 Claims, 3 Drawing Sheets

COEXISTENCE OPERATION METHOD AND RELATED WIRELESS SYSTEM

BACKGROUND

Bluetooth™ and Wi-Fi™ are commonly used wireless data transmission protocols. Wi-Fi and Bluetooth both occupy a section of the 2.4 GHz Industrial, Scientific, and Medical ("ISM") band that is 83 MHz-wide. Bluetooth is an industrial specification that can be used for wireless personal area networks. Bluetooth can be used to connect and exchange information between devices such as mobile phones, laptops, personal computers, hand-held computers, printers, digital cameras, and video game consoles. Bluetooth can be particularly useful when transferring information between two or more devices that are near each other in low-bandwidth situations. Common applications of Bluetooth can include wireless control of and communication between a mobile phone and a hands-free headset (e.g., a Bluetooth ear bud), wireless networking between computers for certain applications, and wireless communications between a computer and input and output devices (e.g., mice, keyboards, and printers). Bluetooth uses Frequency Hopping Spread Spectrum (FHSS) and is allowed to hop between 79 different 1 MHz-wide channels in the ISM band.

"Wi-Fi" refers to wireless technology based upon the IEEE 802.11 standards generally used for wireless local area networking (WLAN). Common applications for Wi-Fi include internet access and network connectivity for consumer electronics such as televisions, DVD players, and digital cameras. Wi-Fi generally uses the same radio frequencies as Bluetooth, but operates using higher power, generally resulting in a stronger connection that can cover a greater distance. Because both Wi-Fi and Bluetooth wireless technology share the spectrum and can often be located in close physical proximity to one another, Time Division Multiplexing (TDM) is a coexistence method where Bluetooth and Wi-Fi take turns transmitting. In TDM, two or more signals or bit streams are transferred appearing simultaneously as sub-channels in one communication channel, but are physically taking turns on the channel. The time domain is divided into several recurrent time slots of fixed length, one for each sub-channel.

Using TDM in Wi-Fi and Bluetooth coexistence system, Bluetooth is not allowed to transmit or receive data packets in Wi-Fi time slots. When more than one Bluetooth links are established with different devices, as long as one of Bluetooth links operates in TDM the other Bluetooth links have to use TDM as well. All Bluetooth links transmit and receive data packets only in Bluetooth time slots, which cause inefficiency in Bluetooth data transmission.

SUMMARY

The disclosure therefore provides a coexistence operation method for a wireless system.

The present invention discloses a coexistence operation method for a wireless system, wherein the wireless system is capable of establishing a first wireless link and a plurality of second wireless link. The coexistence operation method comprises applying different time slots to the first wireless link and a first link of the second wireless links; and applying a different frequency band to a second link of the second wireless links when the different time slots are applied to the first wireless link and the first link of the second wireless links.

The present invention further discloses a wireless system. The wireless system comprises a first wireless module and a second wireless module. The first wireless module is used for establishing a first wireless link and applying a plurality of first time slots to a first wireless link. The second wireless module is used for establishing a plurality of second wireless link and applying a plurality of second time slots to a first link of second wireless links and applying a frequency band to a second link of the second wireless links when is the first time slots and the second time slots are applied to the first wireless link and the first link of the second wireless links.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
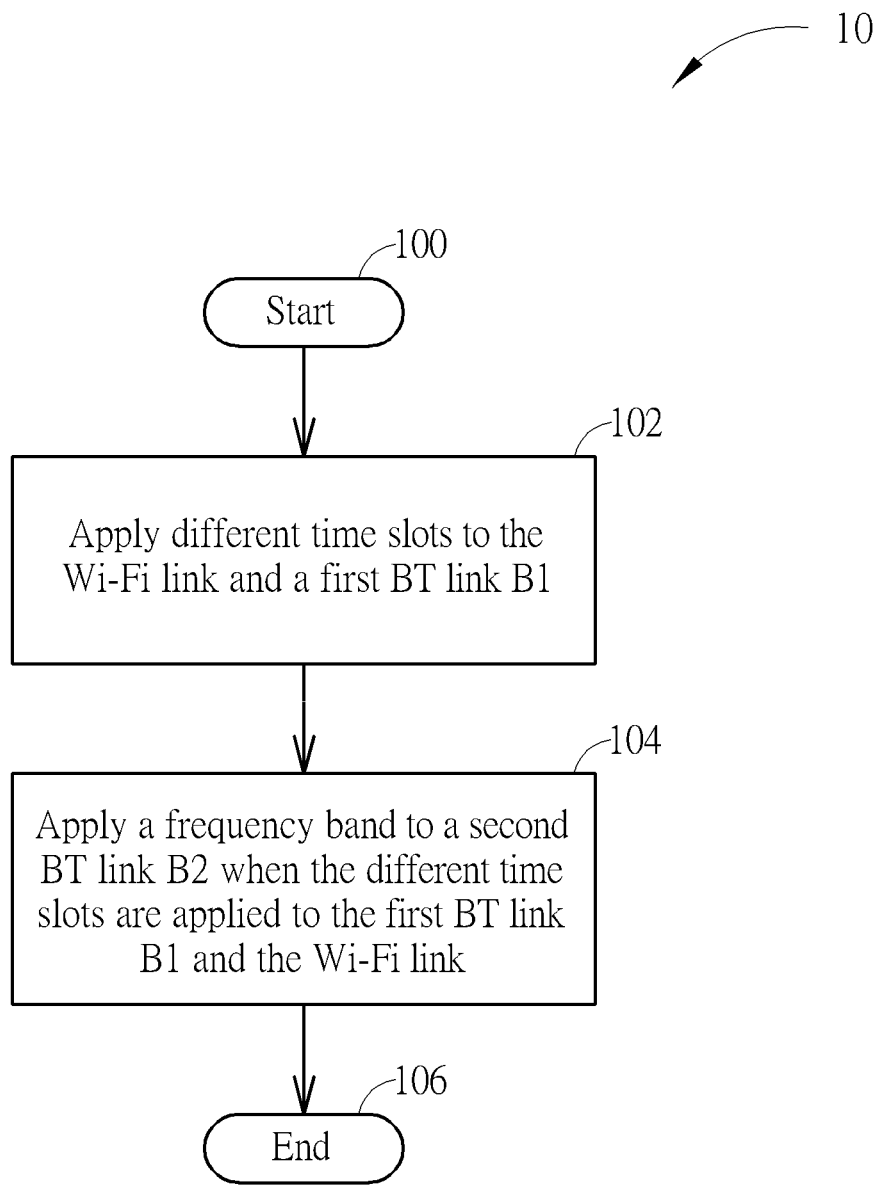
FIG. 1 is a flow chart of a process for a wireless system according to an embodiment of the present invention.

Please refer to FIG. 1, which is a flow chart of a process 10 for a wireless system according to an embodiment of the present invention. The wireless system is capable of establishing a Wi-Fi link and multiple Bluetooth (BT) links. The process 10 is used in the wireless system to perform coexistence operation and includes the following steps:

Step 100: Start.

Step 102: Apply different time slots to the Wi-Fi link and a first BT link B1.

Step 104: Apply a frequency band to a second BT link B2 when the different time slots are applied to the first BT link B1 and the Wi-Fi link.

Step 106: End.

According to the process 10, the Wi-Fi link and the first BT link B1 use Time-Division Multiplexing (TDM) and the second BT link BT2 uses Frequency-Division Multiplexing (FDM). The second BT link B2 does not use TDM when the wireless system uses TDM for the Wi-Fi link and the first BT link B1. In use of TDM, data transmission of the Wi-Fi link is performed in Wi-Fi time slots and data transmission of the first BT link B1 is performed in BT time slots. In use of FDM, data transmission of the second BT link B2 can be performed in the different frequency band over the BT time slots and the Wi-Fi time slots. In other words, the second BT link B2 and the Wi-Fi link both perform data transmission in the Wi-Fi time slots, but in different frequency bands. Since the second BT link can use the Wi-Fi time slots, it improves the efficiency of the Bluetooth data transmission when multiple Bluetooth links are established. Please note that the first BT link B1 and the second BT link B2 are singular in the process 10, but not limited herein. In some examples, there are multiple first BT links B1s and multiple second BT links B2s for Bluetooth data transmission.

For the second BT link B2 and the Wi-Fi link to collaborate with each other, the process 10 can includes another step: powering down the second BT link B2 and the Wi-Fi link. The first wireless link operates at a low level when the BT link B2 uses FDM and the Wi-Fi link and the BT link B1 uses TDM. Since the second BT link B2 and the Wi-Fi link both are powered down, the mutual interference can be reduced. Preferably, the power of the Wi-Fi link can be controlled by a Local Area Network (LAN).

Using FDM, the second BT link B2 can perform data transmission in the Wi-Fi time slots. The second BT link B2 has a stronger immunity to the Wi-Fi link than the first BT link B1 does. For example, a Bluetooth device establishing the second BT link B2 is closer to the wireless system than a Bluetooth device establishing the first BT link B1, or the second BT link B2 has better Received Signal Strength Indicator (RSSI) than the first BT link B1 does, or the frequency bands of second BT link B2 are a farther from a frequency band of the Wi-Fi wireless link than a frequency band of first BT link B1.

Figure 2:
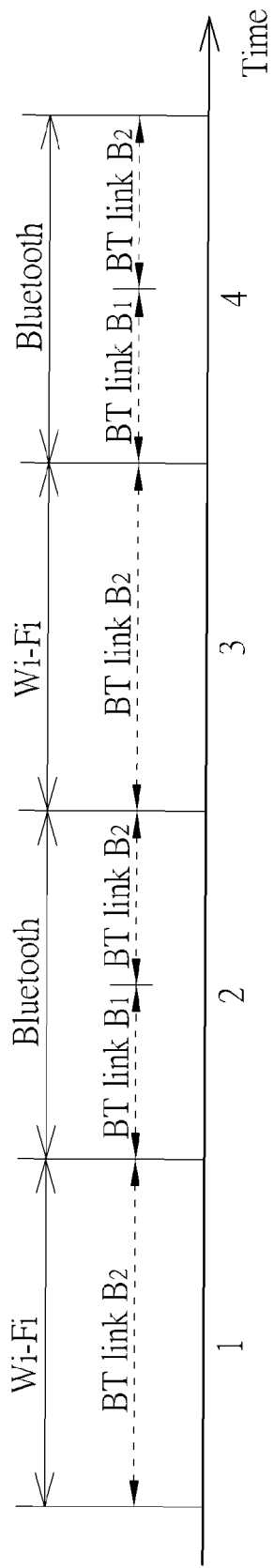
FIG. 2 is a schematic diagram of multiple wireless links in a wireless system according to an embodiment of the present invention.

Please refer to FIG. 2, which is a schematic diagram of multiple wireless links in a wireless system according to an embodiment of the present invention. For simplicity, there are only 4 time slots shown in FIG. 2. The time slots are numbered 1 through 4. The time slots 1 and 3 are allocated for Wi-Fi, and the time slots 2 and 4 are allocated for Bluetooth. As seen in FIG. 2, the Wi-Fi link and the first BT link B1 take turns occupying the time slots via TDM. The second BT link not only uses the time slots allocated for Bluetooth but also the time slots allocated for Wi-Fi.

Figure 3:
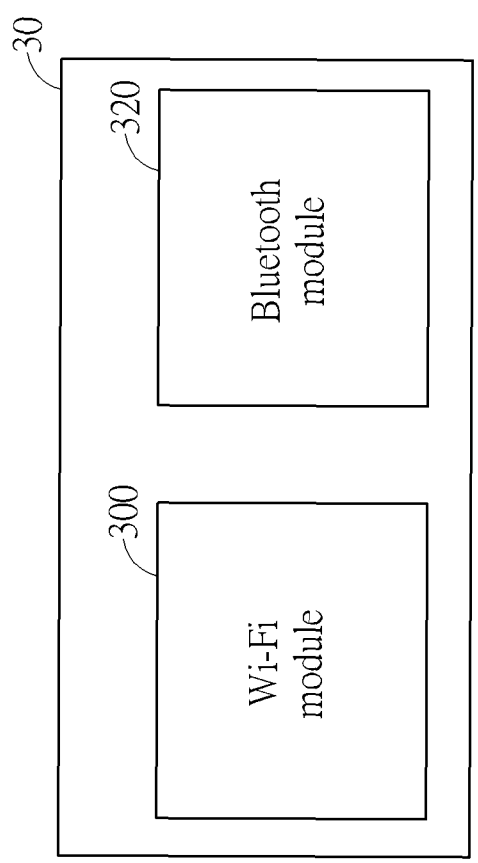
FIG. 3 is a schematic diagram of a wireless system 30 according to an embodiment of the present invention.

Please refer to FIG. 3, which is a schematic diagram of a wireless system 30 according to an embodiment of the present invention. The wireless system 30 can be a mobile phone, a laptop, a tablet or any electronic device capable of establishing Wi-Fi link and multiple Bluetooth links. The wireless system 30 includes a Wi-Fi module 300 and a Bluetooth module 320. The Wi-Fi module 300 is used for establishing the Wi-Fi link with a Local Area Network (LAN) and applying Wi-Fi time slots to the Wi-Fi link. The Bluetooth module 320 is used for establish the Bluetooth links with multiple Bluetooth devices and applying BT time slots to the first BT link B1 and applying a frequency band to the second BT link B2 when the BT time slots and the Wi-Fi time slots are applied to the Wi-Fi link and the first BT link B1. The data transmission of the Wi-Fi link is performed in Wi-Fi time slots and the data transmission of the first BT link B1 is performed in BT time slots. The data transmission of the second BT link B2 is performed in the frequency band over not only in the BT time slots but the Wi-Fi time slots. Since the second BT link can use the Wi-Fi time slots and BT time slots, it improves the efficiency of the Bluetooth data transmission when multiple Bluetooth links are established. The detailed operation of the wireless system 30 can be found above, thus omitted herein.

To sum up, the example of the present invention discloses that when one of the BT links and the Wi-Fi link use TDM, other BT links can receive and transmit data packet in the Wi-Fi time slots by using FDM. Thus, the efficiency of the Bluetooth data transmission can be improved when multiple Bluetooth links are established.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A coexistence operation method for a wireless system, the wireless system capable of establishing a first wireless link and a plurality of second wireless link, the coexistence operation method comprising:

performing data transmission of the first wireless link in a plurality of first time slots;

performing data transmission of a first link of the second wireless links in a plurality of second time slots;

applying a first frequency range to a second link of the second wireless links only during the plurality of first time slots; and applying a second frequency range to the second link of the second wireless links during the plurality of second time slots, wherein the first frequency range is different from the second frequency range;

wherein the first wireless link and the first link of the second wireless links use Time-Division Multiplexing, the first wireless link and the second link of the second wireless links use Frequency-Division Multiplexing and the first wireless link belongs to a first wireless technology, and the second wireless links belong to a second wireless technology different from the first wireless technology.

2. The coexistence operation method of claim 1, wherein the step of applying the first frequency range to the second link of the second wireless links comprises:

operating the first wireless link at a low level.

3. The coexistence operation method of claim 1, wherein the first wireless link is Wi-Fi link and the second wireless links are Bluetooth links.

4. The coexistence operation method of claim 1, further comprising powering down the second link of the second wireless links and the first wireless link.

5. The coexistence operation method of claim 1, wherein the first frequency range of the second link of the second wireless links is farther from a frequency range of the first wireless link than a frequency range of the first link of the second wireless links.

6. The coexistence operation method of claim 1, wherein the second link of the second wireless links has better Received Signal Strength Indicator (RSSI) than the first link of the second wireless links does.

7. A wireless system comprising:

a first wireless module for establishing a first wireless link and applying a plurality of first time slots to a first wireless link; and a second wireless module for establishing a first link of second wireless links with a first device, and establishing a second link of second wireless links with a second device, and performing data transmission of the first link of the second wireless links and data transmission of the second link of the second wireless links in a plurality of second time slots and applying a first frequency range to the second link of the second wireless links only during the plurality of first time slots, and applying a second frequency range to the second link of the second wireless links during the plurality of second time slots, wherein the first frequency range is different from the second frequency range;

wherein the first wireless module is a Wi-Fi module while the first wireless link is Wi-Fi link and the second wireless module is Bluetooth module while the second wireless links are Bluetooth links;

wherein the first wireless link and the first link of the second wireless links use Time-Division Multiplexing, the first wireless link and the second link of the second wireless links use Frequency-Division Multiplexing.

8. The wireless system of claim 7, wherein the first wireless module comprises a first amplifier, and the first amplifier is operated at a low level when the first frequency range is applied to the second link of the second wireless links.

9. The wireless system of claim 7, wherein the first wireless module further performs data transmission of the first wireless link in the first time slot.

10. The wireless system of claim 9, wherein the second wireless module further performs data transmission of the first link of the second wireless links in the second time slot and performs data transmission of the second link of the second wireless links in the first time slot and the second time slot.

11. The wireless system of claim 7, wherein the first wireless link and the second link of the second wireless links are powered down.

12. The wireless system of claim 7, wherein the first frequency range of the second link of the second wireless links is farther from a frequency range of the first wireless link than a frequency range of the first link of the second wireless links.

13. The wireless system of claim 7, wherein the second link of the second wireless links has better Received Signal Strength Indicator (RSSI) than the first link of the second wireless does.

\* \* \* \* \*